United States Patent [19]

Spencer et al.

[11] 4,290,086

[45] Sep. 15, 1981

[54] FIRST GRATE DETECTOR FOR AN OPTICAL SCANNING SYSTEM

[75] Inventors: David R. Spencer, Melville; Leonard Zuckerman, Dix Hills, both of N.Y.

[73] Assignee: Litton Systems, Inc., Melville, N.Y.

[21] Appl. No.: 160,776

[22] Filed: Jun. 18, 1980

[51] Int. Cl.³ .............................................. H04N 1/10
[52] U.S. Cl. .................................... 358/293; 358/285
[58] Field of Search ............... 358/293, 297, 285, 296, 358/264, 268

[56] References Cited

U.S. PATENT DOCUMENTS

| 3,835,249 | 9/1974 | Dattilo | 358/293 |
| 3,849,592 | 11/1974 | Rosenheck | 358/260 |
| 3,943,529 | 3/1976 | Feldman et al. | 358/297 |
| 4,131,916 | 12/1978 | Landsman | 358/285 |

OTHER PUBLICATIONS

T. E. Cassada et al., "Facsimile Scanner" I.B.M. Technical Disclosure Bulletin, vol. 15, No. 4, 9-72.

Primary Examiner—Edward L. Coles
Attorney, Agent, or Firm—Robert F. Rotella; Michael H. Wallach

[57] ABSTRACT

In an optical scanning system the position of a scanning beam is determined by a grating across which the beam is traced and then retraced to start again. The first grate is detected by first filtering the relatively low frequency input signals generated as the beam traces across the grating and the relatively high frequency signals generated as the beam retraces across the grating. The filter passes the low frequency signals, excludes the high frequency signals and accentuates the changes between high and low frequency signals which occur as the beam reaches either end of the grating. By applying the filtered signal to a gating arrangement, it is possible to eliminate one plurality of the signals generated as the beam falls upon the end of the grating. The remaining plurality of signals is further applied to a gate which detects the first grate signal to the exclusion of all others for providing an accurate indication of the start of scan of the optical system.

11 Claims, 4 Drawing Figures

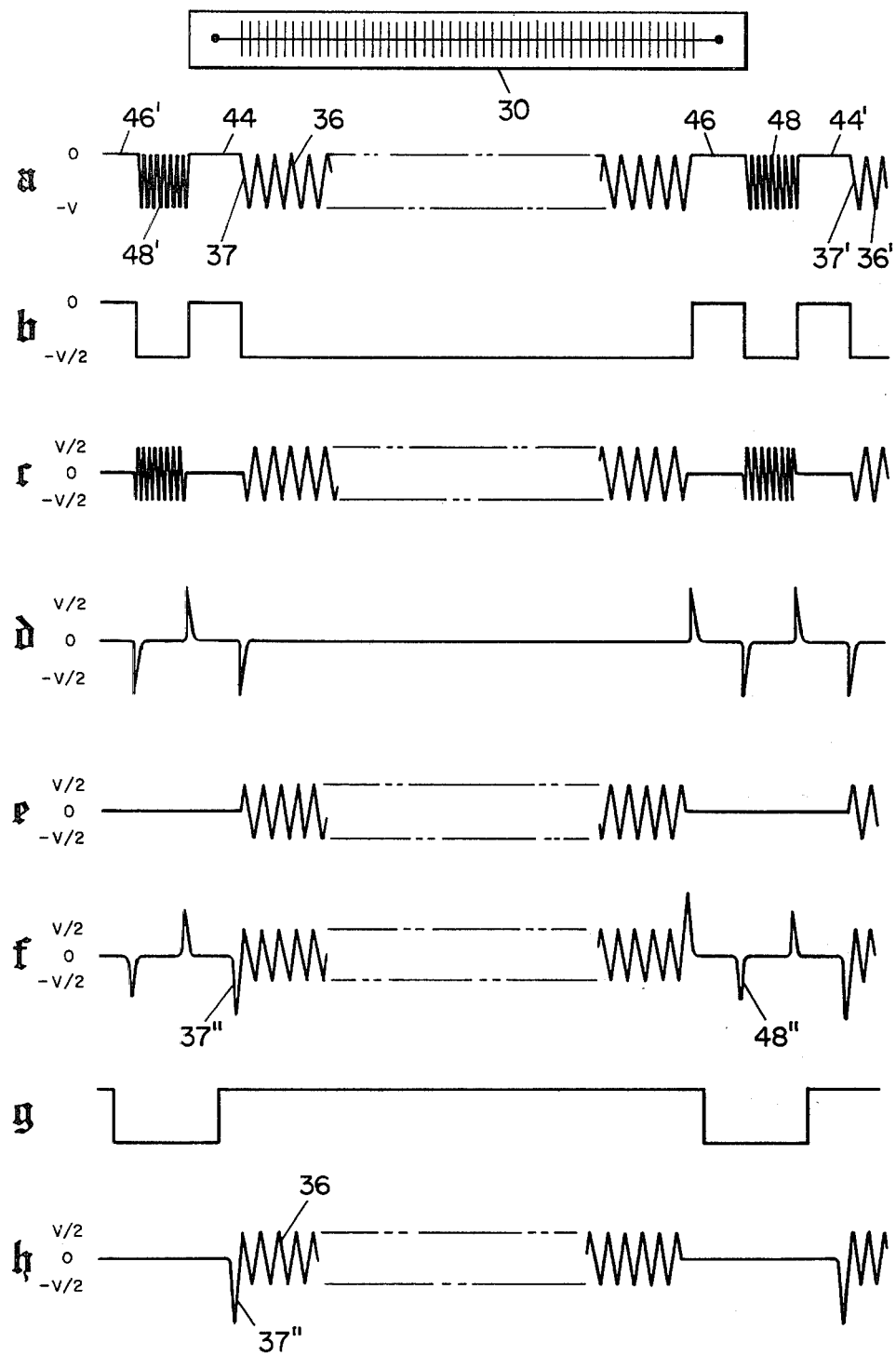

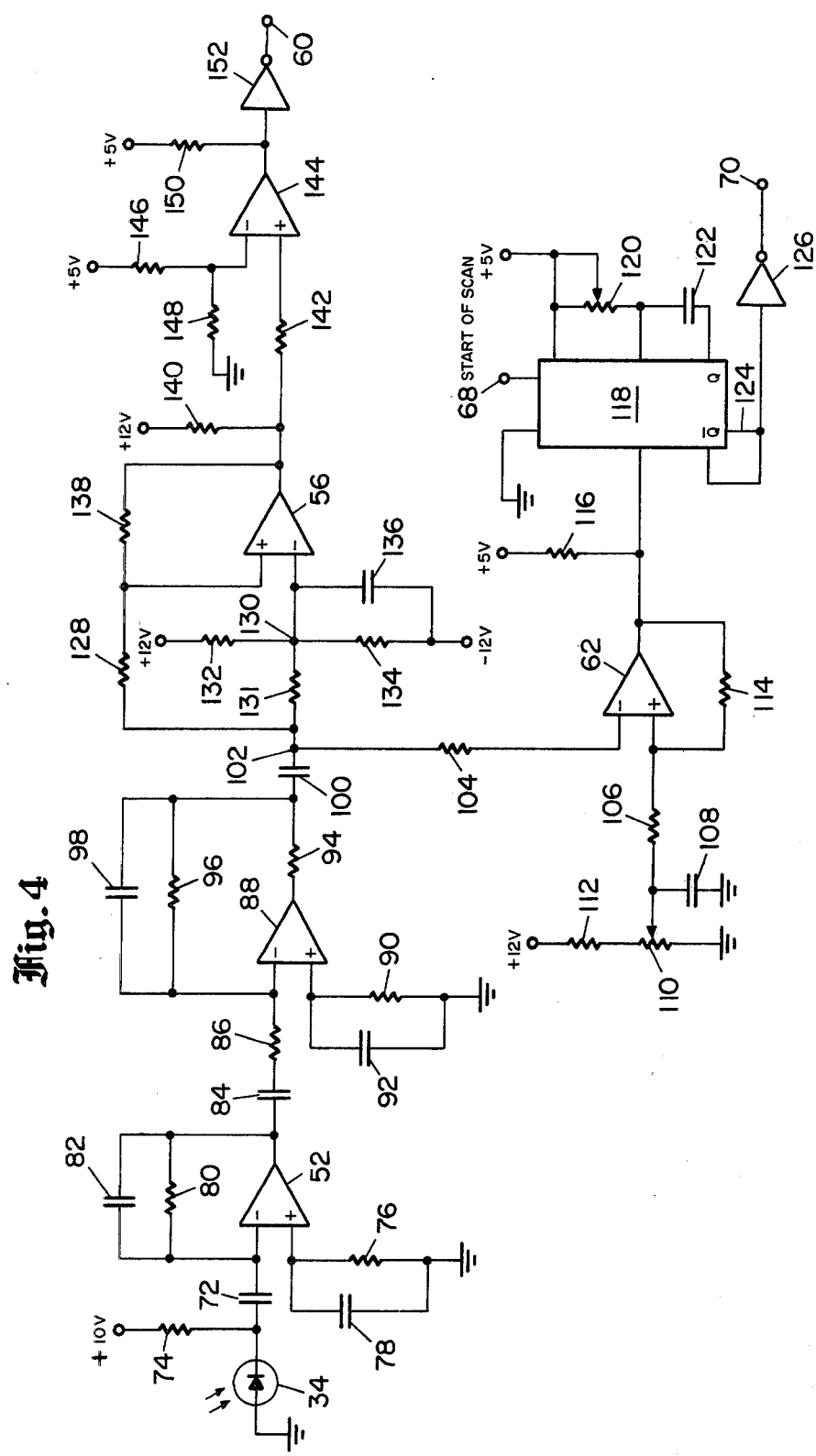

FIRST GRATE DETECTOR FOR AN OPTICAL SCANNING SYSTEM

The present invention relates to a first grate detector for an optical scanning system and, more particularly, to a circuit which utilizes filters and gating devices to accurately identify the first grate signal.

BACKGROUND OF THE INVENTION

It is well known in the prior art to utilize an optical grating to provide positional feedback information to an optical scanning system as the light beam utilized by that scanning system traces across a page from which information is to be extracted or upon which information is to be recorded. It is desirable, in such systems, to know exactly where the first grate begins in order to synchronize the position of the scanning beam with a page and the information being read from the page or to synchronize the scanning beam upon the page where the information is being recorded.

Most prior art devices have utilized a second detector to assure that the optical scanning system knows precisely when the scanning beam has terminated its scan to thereby accurately identify when and where the next scan has begun.

A typical optical facsimile system utilizing a beam to scan a document and a grating to identify the location of the scanning beam is shown in U.S. Pat. No. 3,849,592 which issued Nov. 19, 1974 entitled "Graphic Data Redundancy Reduction For Text and Half-Tone Optical Facsimile System" by Bernard M. Rosenheck which is assigned to the same assignee as the present invention.

SUMMARY OF THE INVENTION

The present invention eliminates the start of line uncertainty without the use of a second detector through the utilization of a grating which is scanned by a beam of electromagnetic energy for energizing a photoconductive diode to increase, for example, the amount of current which passes therethrough. The diode thus produces an output signal which is amplified and applied to a filter and then to suitable gating devices. As the beam of electromagnetic energy sweeps across a typical grating, it eventually comes to the end of the grating and sweeps off the grating onto a transparent or opaque surface. The end of the grating is transparent or opaque depending on whether the grating is formed by an opaque coating upon a transparent substrate or by clear lines formed in an opaque coating covering a transparent substrate. In either event, the frequency generated by the scan, as it is traced across the grating, is lower than the generated frequency of the same scan as it is retraced to the starting point. One feature of the present invention is recognition of this frequency difference and the provision of a filter which excludes the higher frequency signals generated by the sweeping beam as it retraces its path across the grating.

As the beam strikes either end of the grating and enters an area where there are no variations in signal, the output signal from the sweeping beam drops to a zero or another suitable DC level. As the beam sweeps upon the grate, the zero or DC level becomes a rapidly varying signal whose frequency is dependent upon whether the beam is scanning across the grate or retracing its scan. The point at which the signal changes from the DC level to a rapidly varying signal is detected by the filter which generates a spike or transient which is useful in detecting the first grate. That is, the filter produces a transient in one direction as it detects a change from the rapidly varying frequency signal to the DC level and produces a transient in the opposite direction as it detects a change from the DC level to the rapidly varying signal. By applying these transients to gating devices, it is possible to ignore one or the other polarity and quickly eliminate one-half of the transients.

The desired transient generated as the beam sweeps upon the grating and encounters the first grate may be isolated from the other transients of the same polarity by timing devices which establish an adjustable time window after the start of sweep signal. The only transient that occurs with the given polarity during the time established by this window is the first grate.

The system thus described eliminates the need for a second grating detector and accurately identifies the start of scan for synchronizing the recording of information or the reading of information depending on the requirements of the optical scanning system in which the first grate detector is incorporated.

According, it is an object of the present invention to provide an optical scanning system with a first grate detector which eliminates start of line uncertainty without use of a second grate detector.

DESCRIPTION OF THE DRAWINGS

Other objects and further advantages of the present invention will become apparent to those skilled in the art after a careful consideration of the following specification and accompanying drawings wherein:

FIGS. 2a through 2h are a set of waveforms generated by the optical system of FIG. 1 and a first grate detector;

FIG. 4 is a schematic drawing, in greater detail, of the first grate detector of FIG. 3.

DESCRIPTION OF THE PREFERRED EMBODIMENT

Figure 1:
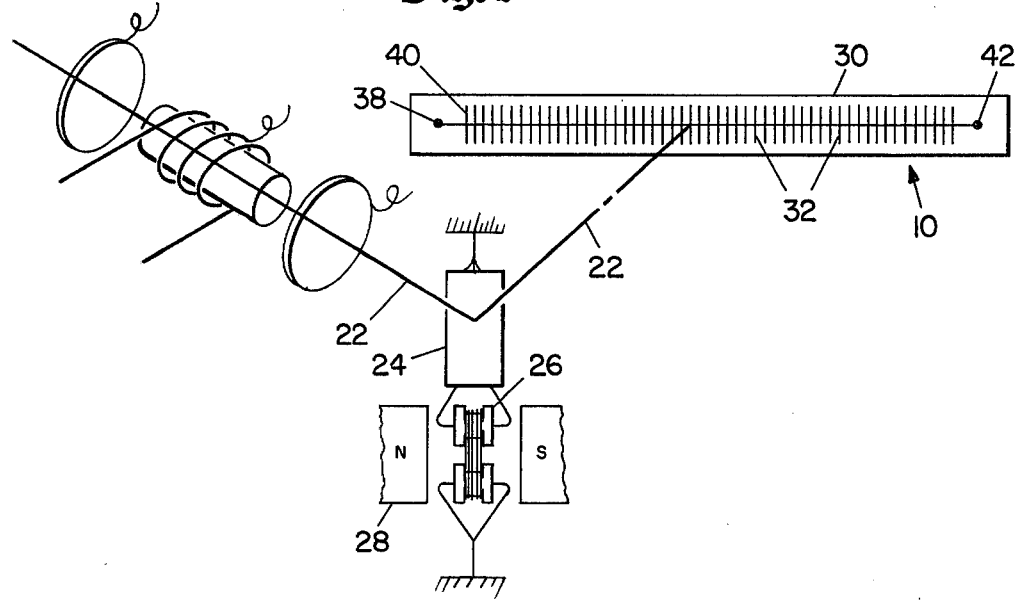
FIG. 1 is a schematic diagram of an optical scanning system utilizing a grating.

Referring now to FIG. 1, an optical scanning system is shown generally at 10 including a source of electromagnetic energy which, in this embodiment, is a laser beam of electromagnetic energy 22. The electromagnetic energy reflects from a galvanometer mirror 24 suspended from a suitable frame by conductive wires which provide an electric current to a galvanometer coil 26 suspended within a magnetic field generated by north and south magnetic poles 28.

As the current varies within the galvanometer coil 26, the galvanometer is caused to deflect within the magnetic field for directing the electromagnetic energy of beam 22 upon a grating 30. The grating may be formed by opaque vertical lines of grates 32 placed upon a transparent substrate or by an opaque coating over a transparent substrate from which vertical lines have been removed to form grates 32.

Figure 3:
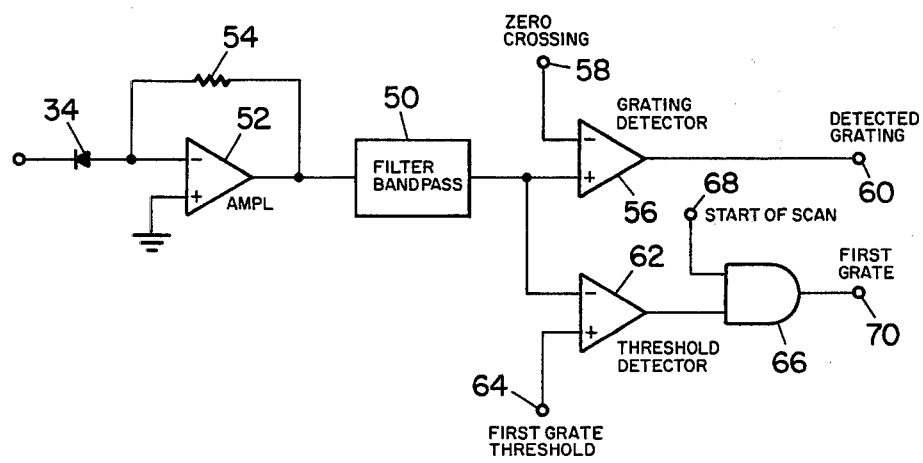
FIG. 3 is a schematic drawing of a first grate detector.

As the beam 22 sweeps across the plurality of grates 32 upon the grating 30, it is interrupted by the grates or permitted to pass therethrough where the electromagnetic energy strikes a photoconductive diode 34, FIG. 3. The diode may be exposed to the grating interruption of the beam 22 by either reflected energy from the grating or by arranging the diode as a long line detector behind the full length of the grating 30.

As the beam 32 starts its sweep across the grating 30, a plurality of approximate sine wave signals are generated at a given frequency depending on the sweep rate and the number of grates 32 per unit of length. These signals are represented in FIG. 2a at 36. It will be understood that the beam 22 starts its sweep at some point 38 upon the end of the grating 30 and continues to sweep across the transparent surface of the grating 30, for example, until it encounters the first grate 40 where the first sine wave signal 37 will be generated. The beam 22 then continues its sweep generating the signals 36 until it reaches the end of the grating and again sweeps upon a transparent surface to the end of its sweep at 42. As the beam moves from its start to end of sweep 38 to 42, it does not generate an output signal while sweeping over the transparent surfaces at each end of the grating 30, as shown at 44 and 46 in FIG. 2a.

The signals 36 are generated at a constant rate. At the end of the sweep 42, as the beam retraces across the gratings 32, the frequency of the signal 48 thus generated is much greater than the frequency of the signal 36. After the beam reaches the end of its retraced sweep, it again sweeps over the transparent end of the grate 30 for generating a signal 44 shown at 44′ in FIG. 2a to indicate a repetition of the first signal. The cycle thus commences again as described above.

FIG. 2b illustrates the curve of FIG. 2a with only the higher frequency components shown. The low frequency or DC components of FIG. 2a shown in FIG. 2b are passed through a band pass filter 50, FIG. 3, which will be described in greater detail hereinbelow, to generate the signals shown in FIG. 2d. The abrupt changes caused when the low frequency signals 36 or the high frequency signals 48 change to a positive DC level are shown as positive going spikes at the point of change. Similarly, the change from the DC level to the saw tooth signals are shown as negative going spikes. The high frequency component of the signal shown in FIGS. 2a and 2c is filtered to eliminate the high frequency signal 48 and pass the lower frequency signal 36 shown at FIG. 2e.

These signal components shown in FIGS. 2d and 2e are recombined as they actually pass through the filter 50 in FIG. 2f. Here, it should be noted that the first grate 40 produces a first signal 37″ which is substantially larger than the other sine wave signals. This amplification is due to the transient effect generated as the light beam passes from the transparent end portions of the grating 30 onto the plurality of grates 32. The first abrupt change generates a much larger signal than the following changes. FIG. 2g illustrates the timing of the signal applied to the galvanometer coil 26 for initiating the trace and retrace of the beam. Note that the retrace signals are initiated at some time before the beginning of the low frequency signal 36 and the higher frequency signal 48 since it is understood that the beam must begin to move before it strikes the grating which generates these signals. By utilizing the start of scan signal shown at FIG. 2g to reset suitable gating devices described hereinbelow, it is possible to remove all but one transient signal from the filtered signal of FIG. 2f and insure that but one transient will be identified by the first grate detector circuitry as the first grate.

Referring now to FIG. 3, the first grate detector circuitry is shown in greater detail wherein the diode 34 is connected to a negative input port of an amplifier 52 whose positive input is connected to ground. The output of the amplifier 52 connects to the band pass filter 50 and through a feedback network represented by resistor 54 to its negative input. The output of the band pass filter 50 is applied to the positive input terminal of a grating detector 56 which is a comparator amplifier whose negative input terminal is connected to a zero crossing network illustrated by terminal 58. The output of the grating detector is applied to a grating terminal 60 which provides the grating signal information for the optical scanning system 10.

The output from filter 50 is also applied to the negative input terminal of a threshold detector 62 which is a comparator whose positive input terminal is connected to a first grate threshold circuit illustrated by terminals 64. Any signal that exceeds the first grate threshold generated by a network 64 is applied from the output of the threshold detector 62 to the input terminal of an AND gate 66 whose second input terminal 68 receives the start of scan signal applied to coil 26. When both signals are present at the input of AND gate 66, the output of AND gate 66 becomes the first grate detection signal applied to output terminal 70.

Referring now to FIG. 4, the details of the band pass filter 50, amplifier 52, grating detector 56, threshold detector 62 and AND gate 66 will be described in greater detail. The diode 34 is a photoconductor diode arranged so that increased light falling upon it will increase the amount of current which may flow through it. The anode of diode 34 connects to ground while its cathode connects through a capacitor 72 to the negative input port of amplifier 52. The cathode of diode 34 is also connected through a resistor 74 to a source of positive potential. The positive input of amplifier 52 connects through a resistor 76 and parallel capacitor 78 to ground. The output of amplifier 52 connects through a feedback resistor 80 and parallel feedback capacitor 82 to the negative input port while also connecting through a serially connected capacitor 84 and resistor 86 to a negative input port of a second amplifier 88. The positive input port of amplifier 88, like amplifier 52, connects through a resistor 90 and a parallel capacitor 92 to ground. The output from amplifier 88 is connected through a resistor 94 and then a feedback resistor 96 having a parallel feedback capacitor 98 to the negative input port of amplifier 88. The junction between resistors 94 and 96 is connected through a capacitor 100 to a junction node 102.

The circuit formed by resistor 80, capacitor 82, capacitor 84, resistor 86, resistor 96 and capacitor 98 creates the filter 50 which, in combination with the amplifiers 52 and 88 and the parallel resistor capacitor connections to ground to form a Pi configured filter. To a lesser extent the capacitors 72 and 100 function as part of the filter 50.

The output signal from the filter 50 applied to node 102 is applied through a resistor 104 to the negative input terminal of the threshold detector formed by the comparator 62. The positive input port of comparator 62 connects through a resistor 106 and capacitor 108 to ground, while the junction between resistor 106 and capacitor 108 connects to the wiping terminal of a potentiometer 110. The fixed resistor within potentiometer 110 has one terminal connected through a resistor 112 to a source of positive potential while the second terminal thereof connects to ground. The first grate threshold network 64 is thus formed by the combination of the resistors 106 and 112, potentiometer 110 and capacitor 108. The comparator circuit 62 is completed by a feedback resistor 114 connected from the output terminal thereof to the positive input terminal.

The output of comparator 62 is connected through a resistor 116 to a source of positive potential and to an input terminal of a monostable multivibrator 118. The monostable multivibrator is provided with a reset terminal connected to terminal 68 to receive the start of scan signal, FIG. 2g, which resets the multivibrator on the positive going edge of the signal shown. A first of three input terminals of the multistable multivibrator 118 is connected to a source of positive potential while a serially connected trimming resistor 120 connects between the first and second terminal and a capacitor 122 connects between the second and third terminal. After reset from the start of scan signal, this circuit formed by resistor 120 and capacitor 122 adjusts a time delay between receipt of the first transient 37" and application of an output signal from terminal 124 to the input of an inverter 126 and then to the first grate detection terminal 70 to complete the circuit.

While an AND gate may be used as described in FIG. 3, the monostable multivibrator 118 serves a useful function. As will be seen in FIG. 2, the first grate 40 produces a signal 37 that is substantially larger at 37" than the signals produced by the other grates 32 after passing through filter 50. The transient 37" is in fact so large that the signal generated by the second grate is generally diminished. In order to insure starting at the same point within the circuit during each repetitive sweep, the first grate detect signal is not generated in the circuit shown in FIG. 4 until the third grate. That is, the first grate generates the large transient 37" which is applied to the input terminal of the monostable multivibrator 118. After the predetermined delay established by the circuit of resistor 120 and capacitor 122, the output is generated at terminal 124 which has been delayed long enough to allow the first and second grates to pass thus generating the first grate signal at the time of the third grate.

Referring again to FIG. 4, the positive terminal of the grating detector 56 is also connected to the node 102 by a resistor 128. The negative terminal of detector 56 is connected to node 102 via junction 130 and a resistor 131. Connected to the junction 130 is the junction of a pair of serially connected resistors 132 and 134 connected respectively to positive and negative input potentials. The negative input potential also connects through a capacitor 136 to the negative input port of detector 56. The zero crossing network 58 thus comprises the resistor 131, serially connected resistors 132 and 134, and capacitor 136. The output of comparators 56 connects through a resistor 138 to the positive input terminal to complete that circuit.

The output of comparator 56 also connects through a resistor 140 to a positive potential and through a second resistor 142 to the positive input terminal of a buffer amplifier 144. The negative input terminal of the buffer 144 connects to a source of positive potential through a resistor 146 and to ground through a resistor 148. The output of the buffer 144 connects to a positive potential through resistor 150 and to the detected grating terminal 60 through an inverter 152 to complete the circuit.

In operation, signals from the diode 34 pass through the amplifier formed by amplifiers 52 and 58 and are filtered by the filter 50 to remove or block the high frequency signal 48 while permitting the passage of the lower frequency signal 36. The lower frequency portion of the band pass filter 50 blocks the DC components of the signal to allow only transient spikes to pass thus generating the signal shown at FIG. 2f which is applied to the node 102. This signal is then applied through the grating detector 56 to the detected grating output terminal 60 to produce the desired signals used by the optical scanning system 10 to track the location of the scanning beam 22 upon a page.

The output from node 102 is also applied through the threshold detector 62 to the AND gate 66 or the monostable multivibrator 118. Only negative signals pass through the threshold detector 62 as the node 102 is connected to the negative terminal. These signals are compared against the first grate threshold signal generated at terminal 64. The threshold signal is set at a value larger than most of the lower frequency signals 36 and blocks these signals but for the transient signals, such as that generated by the first grate as shown in FIG. 2f at 37". A similar negative going signal is also generated at the beginning of the retrace sweep which is shown in FIG. 2f at 48". The first transient signal 37" representing the first grate 40 is applied from threshold detector 62 to the multivibrator 118. This multivibrator has been reset by the positive going edge of the start of scan signal shown in FIG. 2g. Thus, the multivibrator 118 AND gate 66 pass only the transient 37" since the multivibrator or AND gate is disabled during the time that transient 48" is applied to either input thereof.

The signal shown at FIG. 2h represents the signal which is created by the combination of the signals at terminals 60 and 70 wherein but one transient pulse 37" is generated to represent the first grate. If the multivibrator 118 is used, this signal is used to start the first grate detection which is actually generated on the third grate due to the delay.

It should be noted that the filter 50 is not necessary in some applications. By reference to FIG. 2f, it will be seen that the amplified, negative transient 37" appears only once after the start of sweep signal FIG. 2g goes positive. Thus, the filter 50 need only be a device which will provide an amplified transient when the DC signal, created while the beam scans the end of the grating, changes to the sine wave signal. Any high frequency signal 48 which might be passed by the absence of the filter will not pass terminal 70 as it is blocked by the AND gate 66 and the low signal, FIG. 2g, which disables the gate. However, unless terminal 60 is also disabled, the high frequency signal 48 could cause ambiguity at terminal 60.

The present invention has been described utilizing either an AND gate 66 or a monostable multivibrator 118. The grating has also been described as utilizing either transparent or opaque grates with the diode 34 connected for a transparent grate in FIG. 3 and an opaque grate in FIG. 4. Clearly, other modifications and variations of the present invention will become apparent to those skilled in the art; and the present invention should be limited only by the appendant claims.

We claim:

1. An optical scanning system using a beam of electromagnetic energy and a grating for providing scan position information as said beam traces said grating and then retraces back across said grating for the next trace, comprising:

means for generating an output signal as said beam of electromagnetic energy traces each grate in said grating;

means for suppressing said output signal as said beam retraces back across said grating;

means for detecting said output signal above a threshold; and means for detecting a given portion of said output signal above said threshold whereby said portion represents a first grate signal.

2. An optical scanning system, as claimed in claim 1, wherein said means for detecting a first of said output signals includes an AND gate which receives said first output signal above said threshold and a signal generated to start said scan.

3. An optical scanning system, as claimed in claim 1, wherein said means for detecting the given portion of said output signal includes a delay circuit which produces an output signal after a delay upon receipt of said first output signal above said threshold whereby said first grate signal is free of variations caused by transient signals.

4. An output scanning system, as claimed in claim 3, wherein said means for detecting a first of said output signals includes an AND gate which receives said first output signal above said threshold and a signal generated to start said scan.

5. An optical scanning system, as claimed in claim 1, wherein said means for generating an output signal include photodiode means and amplifier means.

6. An optical scanning system, as claimed in claim 1, wherein a bandpass filter filters said output signal to pass lower frequencies of said output; signal as said beam of electromagnetic energy starts said trace across said grating and blocks a higher frequency of said output signal as said beam of electromagnetic energy retraces across said grating.

7. An optical scanning system, as claimed in claim 1, wherein said means for detecting said output signal above said threshold included means for generating a fixed level voltage signal and comparator means which receive said output signal and compare said output signal against said fixed level voltage signal.

8. In an optical scanning system using a beam of electromagnetic energy for document scanning and a grating for providing scan position information by generating output signals as said beam starts its trace across said grating and then retraces back across said grating for the next scan, the improvement comprising:

means for filtering said output signals wherein lower frequency output signals generated as said beam traces across said grating are passed while higher frequency output signals generated as said beam retraces back across said grating are blocked; and means for detecting a transient signal generated as a first grate is traced by said beam at the start of each trace wherein said first grate is reliably detected.

9. In an optical scanning system, as claimed in claim 8, wherein the improvement additionally comprises:

said grate including end areas free of said grates wherein said beam generates no output signal when scanning said end areas between said trace and retrace;

said means for detecting said transient signal includes gate means which detect only those transients generated as said beam leaves said end areas to start said trace and retrace of said grating; and said gate means includes additional gate means for enabling said gate means to detect said transient signal generated as said beam leaves said end area to start said trace while disabling said gate means to reject said transient signal generated as said beam leaves said end area to start said retrace.

10. In an optical scanning system using a beam of electromagnetic energy for document scanning which is controlled by a scan signal and a grating for providing scan position information by generating output signals while said beam traces across said grating and then retraces back across said grating, the improvement comprising:

means for amplifying a first of said output signals as said beam starts its trace and retraces across the first grate of said grating to create first transient signals greater than the following output signals;

means for detecting said first transient signals and for blocking one polarity of said first transient signals while passing the other; and gate means connected to receive said passed polarity of first transient signals and said scan signal, whereby the only first transient signal present during said scan signal is a desired first grate signal.

11. In an optical scanning system, as claimed in claim 10, the improvement additionally comprising:

filter means connected to receive said output signals for passing said output signals as said beam traces across said grating and blocking said output signals as said beam retraces back across said grating.

* * * * *